R. J. MESSIER.
MEASURING INSTRUMENT.
APPLICATION FILED JUNE 6, 1914.

1,129,705.

Patented Feb. 23, 1915.

Inventor
Rodolph J. Messier,

Witnesses
C. F. Rudolph
Dudley B. Howard

By Victor J. Evans
Attorney

UNITED STATES PATENT OFFICE.

RODOLPH J. MESSIER, OF FALL RIVER, MASSACHUSETTS.

MEASURING INSTRUMENT.

1,129,705.  Specification of Letters Patent.  Patented Feb. 23, 1915.

Application filed June 6, 1914. Serial No. 843,482.

*To all whom it may concern:*

Be it known that I, RODOLPH J. MESSIER, a citizen of the United States, residing at Fall River, in the county of Bristol and State of Massachusetts, have invented new and useful Improvements in Measuring Instruments, of which the following is a specification.

This invention relates to measuring instruments and in particular to calipers and dividers, such as are used in the mechanical arts.

The object I have in view is to depart from the ordinary pivoted member device of this character by providing an instrument wherein the relatively movable gaging members are maintained constantly in parallel relation to each other throughout their entire range of adjustment.

I propose further to provide a combination instrument of this character wherein the relatively adjustable gaging members are provided with surfaces for inside and outside caliper work and also with divider points, scales of lineal measurement being provided in conjunction with the gaging members, which are so disposed that the distance between either the inside calipering surfaces and the divider points, or the outside calipering surfaces may be ascertained by direct reading.

A further object of the invention is to provide an instrument of the class described which comprises few parts and is extremely simple in construction, whereby it is rendered inexpensive in cost of manufacture, durable, and capable of being used conveniently and accurately in various capacities.

Figure 1:
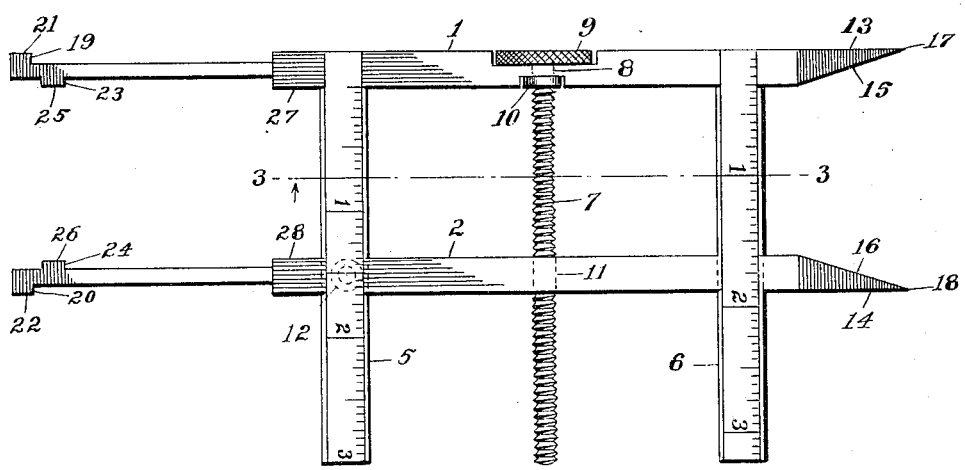
Figure 2:
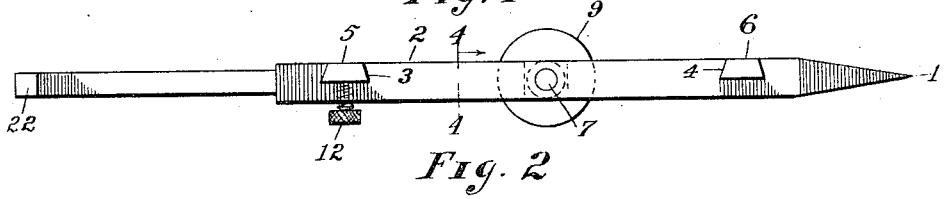
Figure 3:
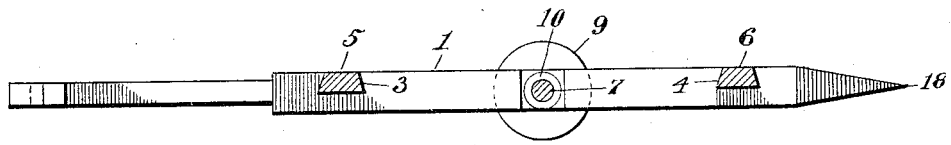
Figure 4:
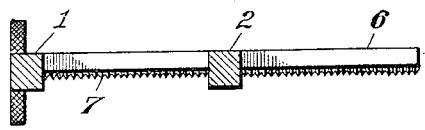

With these and other objects in view, the invention consists in the construction and combination of parts hereinafter described and claimed, reference being had to the accompanying drawings, in which:

Figure 1 is a top plan view of the instrument. Fig. 2 is a side elevation of the same. Fig. 3 is a transverse sectional view on line 3—3 of Fig. 1; and Fig. 4 is a similar view on line 4—4 of Fig. 2.

In the drawing, the numerals 1 and 2 designate the relatively movable, parallel gaging members of the device. The member 2 is provided at longitudinally spaced points with transversely extending, dove-tailed slots 3 and 4 in which are slidably engaged the transversely extending guide arms 5 and 6 respectively, which project from the other gaging member 1, to which corresponding ends of the arms are fixedly connected. Scales of lineal measurement are provided upon the guide arms 5 and 6 and extend longitudinally thereon, the scale upon the former arm being arranged to read from the inner longitudinal edge of the gaging member 1 as a terminal, whereas the scale upon the arm 6 terminates with the outer longitudinal edge of the said member, for a purpose which will be described presently.

An adjusting screw 7 is mounted midway between the guide arms 5 and 6 in parallel relation thereto and has one end rotatably mounted within a lateral opening 8 provided in the gaging member 1. A manipulating head 9 is fixedly mounted upon this end of the adjusting screw outwardly of the member 1 and a limiting flange 10 is provided upon the screw on the opposite side of the member 1 for coöperation with the head 9 to prevent sliding movement of the screw with respect to the said member. The threaded portion of the screw 7 extends through a threaded opening 11 in the gaging member 2 so that the members 1 and 2 may be adjusted relatively by rotating the screw. A set screw 12 is mounted adjustably within the member 2 for engagement with the guide arm 5, and serves as means by which the gaging members may be locked in adjusted position.

The gaging members are co-extensive and have their ends adjacent to the guide arm 6 beveled inwardly from their opposite longitudinal faces 13 and 14 as at 15 and 16 respectively to provide divider extremities 17 and 18. The opposite end portions of the members 1 and 2 are each transversely reduced in thickness, laterally projecting portions 19 and 20 respectively being left upon the outer longitudinal edges of the said reduced ends. These portions are substantially in the form of rectangular lugs and have their outer surfaces 21 and 22 arranged flush with the surfaces 13 and 14 of the said members for use in inside caliper work. Similar lug portions 23 and 24 project inwardly from the said ends of the gaging members 1 and 2 respectively adjacent to the portions 19 and 20, the inner active faces 25 and 26 of the same being disposed flush with the main inner faces 27 and 28 respectively of the members 1 and 2 for use in outside caliper work.

From the foregoing description, taken in connection with the accompanying drawing, it should be apparent that the relatively movable gaging members of the device may be adjusted accurately and quickly in setting the inside calipering surfaces 21 and 22 and the divider extremities 17 and 18, or in setting the outside calipering surfaces 25 and 26, owing to the manner in which the gaging members are arranged and connected with the guide arms 5 and 6, and to the provision of the specific means for accomplishing this adjustment and determining the degree of adjustment. The scale provided upon the arm 5 gives the direct reading of the distance between the outside calipering surfaces, whereas the scale provided upon the other arm 6 gives the direct reading of distances between the inside calipering surfaces or the divider extremities. It is to be understood, however, that I do not necessarily limit myself to the exact details of construction shown and described, but reserve the right to make minor changes therein, such as fall within the scope of the appended claims, whenever found necessary in practice.

Having thus described my invention, I claim:

1. An instrument of the class described comprising a plurality of elongated, parallel gaging members having opposed gaging surfaces, a plurality of guide arms extending laterally from one of the said members, each arm being dove-tailed in cross section and the other gaging member being provided with transverse slots similar in shape thereto for the slidable reception of the said arms, and means by which the gaging members may be adjusted relatively, each guide arm being provided with a longitudinal scale of lineal measurement terminating flush with the gaging surfaces of the member fixedly connected to the arm.

2. An instrument of the class described comprising a plurality of elongated, parallel gaging members having opposed gaging surfaces, a plurality of guide arms extending laterally from one of the said members, each arm being dove-tailed in cross section and the other gaging member being provided with transverse slots similar in shape thereto for the slidable reception of the said arms, and means by which the gaging members may be adjusted relatively, the gaging surfaces of said members being arranged flush with the outer longitudinal faces of the members, the said members being provided further with a second set of gaging surfaces disposed flush with the inner longitudinal faces of the respective members, the said guide arms being provided with longitudinal scales of lineal measurement, the scale upon one arm being arranged to terminate with the outer longitudinal face of the member to which the said arm is fixed and the scale upon the other arm terminating with the inner longitudinal face of the said member.

In testimony whereof I affix my signature in presence of two witnesses.

RODOLPH J. MESSIER.

Witnesses:
  ADELARD J. CARTIER,
  ADELARD CAULT.

Copies of this patent may be obtained for five cents each, by addressing the "Commissioner of Patents, Washington, D. C."